US009769770B2

(12) United States Patent
Littlejohn

(10) Patent No.: US 9,769,770 B2
(45) Date of Patent: Sep. 19, 2017

(54) IN-BAND ON-CHANNEL BROADCASTING VIA MESH NETWORK

(71) Applicant: iHeartMedia Management Services, Inc., San Antonio, TX (US)

(72) Inventor: Jeffrey Lee Littlejohn, Cincinnati, OH (US)

(73) Assignee: iHeartMedia Management Services, Inc., San Antonio, TX (US)

( * ) Notice: Subject to any disclaimer, the term of this patent is extended or adjusted under 35 U.S.C. 154(b) by 0 days.

(21) Appl. No.: 14/965,636

(22) Filed: Dec. 10, 2015

(65) Prior Publication Data

US 2017/0171827 A1    Jun. 15, 2017

(51) Int. Cl.
| | |
|---|---|
| *H04B 1/18* | (2006.01) |
| *H04W 52/32* | (2009.01) |
| *H04W 72/00* | (2009.01) |
| *H04W 52/24* | (2009.01) |
| *H04W 84/18* | (2009.01) |

(52) U.S. Cl.
CPC ......... *H04W 52/322* (2013.01); *H04W 52/24* (2013.01); *H04W 72/005* (2013.01); *H04W 84/18* (2013.01)

(58) Field of Classification Search
CPC ............... H04H 20/30; H04H 2201/20; H04H 2201/183; H04B 7/0805; H04B 7/0837
See application file for complete search history.

(56) References Cited

U.S. PATENT DOCUMENTS

| | | | | |
|---|---|---|---|---|
| 7,254,374 B2* | 8/2007 | Downs | ...................... | H01P 5/04 330/53 |
| 2002/0172270 A1* | 11/2002 | Whikehart | ............. | H04H 40/18 375/216 |
| 2008/0272934 A1* | 11/2008 | Wang | ........................ | H02J 3/14 340/870.11 |
| 2010/0210229 A1* | 8/2010 | Inako | ..................... | H04H 20/30 455/190.1 |

FOREIGN PATENT DOCUMENTS

| | | |
|---|---|---|
| WO | 2004023748 A1 | 3/2004 |
| WO | 2005025100 A3 | 3/2005 |

* cited by examiner

*Primary Examiner* — Bobbak Safaipour
(74) *Attorney, Agent, or Firm* — Garlick & Markison; Edward J. Marshall

(57) ABSTRACT

Digital content can be broadcast in a sideband of an analog broadcast channel using multiple digital in-band on-channel (IBOC) transceivers connected in a mesh configuration to form an IBOC mesh network. The digital IBOC transceivers are positioned at various geographic locations, so that unlike traditional "HD" radio broadcasts, the IBOC broadcast transmission is spread out over a wide area, using multiple low power digital IBOC transceivers rather than being broadcast from the same location as the analog signal. IBOC transmission power can be limited to a desired portion of the power used to broadcast the analog signal, based on measurements taken at the geographically distributed digital IBOC transceivers. The IBOC mesh network provides bi-directional communication between a mesh transceiver and a user device, and delivers user feedback received at one mesh transceiver to a feedback server by moving the user feedback through the IBOC mesh network.

19 Claims, 9 Drawing Sheets

US 9,769,770 B2

IN-BAND ON-CHANNEL BROADCASTING VIA MESH NETWORK

CROSS REFERENCE TO RELATED PATENTS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to in-band on-channel broadcasting and more particularly to in-band on-channel broadcasting using a mesh network.

2. Description of Related Art

In the United States each analog FM radio station is assigned a channel centered on a particular frequency, with spacing of 0.2 MHz between channels. If an analog radio station is, for example, assigned a frequency of 93.7 MHz, the next station cannot be closer than 93.5 MHz or 93.9 MHz. An analog FM station, however, does not actually need to use the entire 0.2 MHz bandwidth for broadcasting the FM signal. Even leaving room for a guard band to help protect against interference from adjacent stations, there is enough remaining bandwidth to accommodate the transmission of digital signals within the 0.2 MHz of bandwidth allocated to the FM radio station.

Broadcasting both digital and analog radio signals in the same portion of the radio frequency spectrum previously used to broadcast only the analog radio station, 0.2 MHz in this example, is referred to generically as in-band on-channel (IBOC) broadcasting. Many members of the public know in-band on-channel broadcasting by the name HD Radio, which is a brand name used by iBiquity®.

As illustrated in prior art FIG. 1, current systems perform IBOC broadcasting by transmitting both the digital and analog radio signals from one location using separate antenna systems for the digital and analog signals, or by multiplexing the digital and analog signals for transmission by a single antenna system. For example, FM radio station 110 broadcasts both analog and IBOC digital content from broadcast location 120. The analog signal can be used by analog receiver 130, and IBOC signal can be used by an IBOC capable receiver 140.

The Federal Communications Commission (FCC) has established various rules regarding the power of the digital broadcast signals in relationship to the power of an analog broadcast, and the National Radio Systems Committee (NRSC) has published power guidelines for FM IBOC, for example NRSC-G202, published September, 2010. The FCC rules and the NRSC guidelines describe how much power a digital signal broadcast using IBOC techniques can use, compared to the analog broadcast signal. For example, NRSC-G202 indicates that for symmetric sidebands using service mode MP1, the nominal power of the digital broadcast signal compared to the analog broadcast signal is between −20 dBc (decibels relative to the carrier) and −10 dBc. Translated to percentages, the power of the digital signal is between 1% and 10% of the analog broadcast signal's power. Prior art FIG. 1 illustrates this currently allowed power relationship. It should be noted that other power ratios or relationships can apply for different broadcast modes, and for asymmetrical side-band transmissions.

A benefit of limiting the power of the IBOC digital signals is that interference with analog broadcast signals can be controlled. A drawback is that the lower transmission power of IBOC signals can also limit the area over which the IBOC signals can be reliably received.

BRIEF SUMMARY OF THE INVENTION

The present invention is directed to apparatus and methods of operation that are further described in the following Brief Description of the Drawings, the Detailed Description of the Invention, and the claims. Various features and advantages of the present invention will become apparent from the following detailed description of the invention made with reference to the accompanying drawings.

BRIEF DESCRIPTION OF THE SEVERAL VIEWS OF THE DRAWING(S)

DETAILED DESCRIPTION OF THE INVENTION

As used herein the term "in-band on-channel (IBOC)," as used herein unless otherwise specified or required by content, refers generally to broadcasting one or more digital RF signals in the same RF channel in which an analog signal is being concurrently broadcast, using one or more sidebands of the analog signal within the RF channel. The terms IBOC transmitter, IBOC transceiver, IBOC power, and similar terms should be understood to refer to a digital IBOC transmitter, a digital IBOC transceiver, and digital IBOC power, respectively. Although some embodiments may be implemented using mixed analog and digital IBOC techniques, at least one embodiment uses digital-only IBOC techniques.

Figure 2:
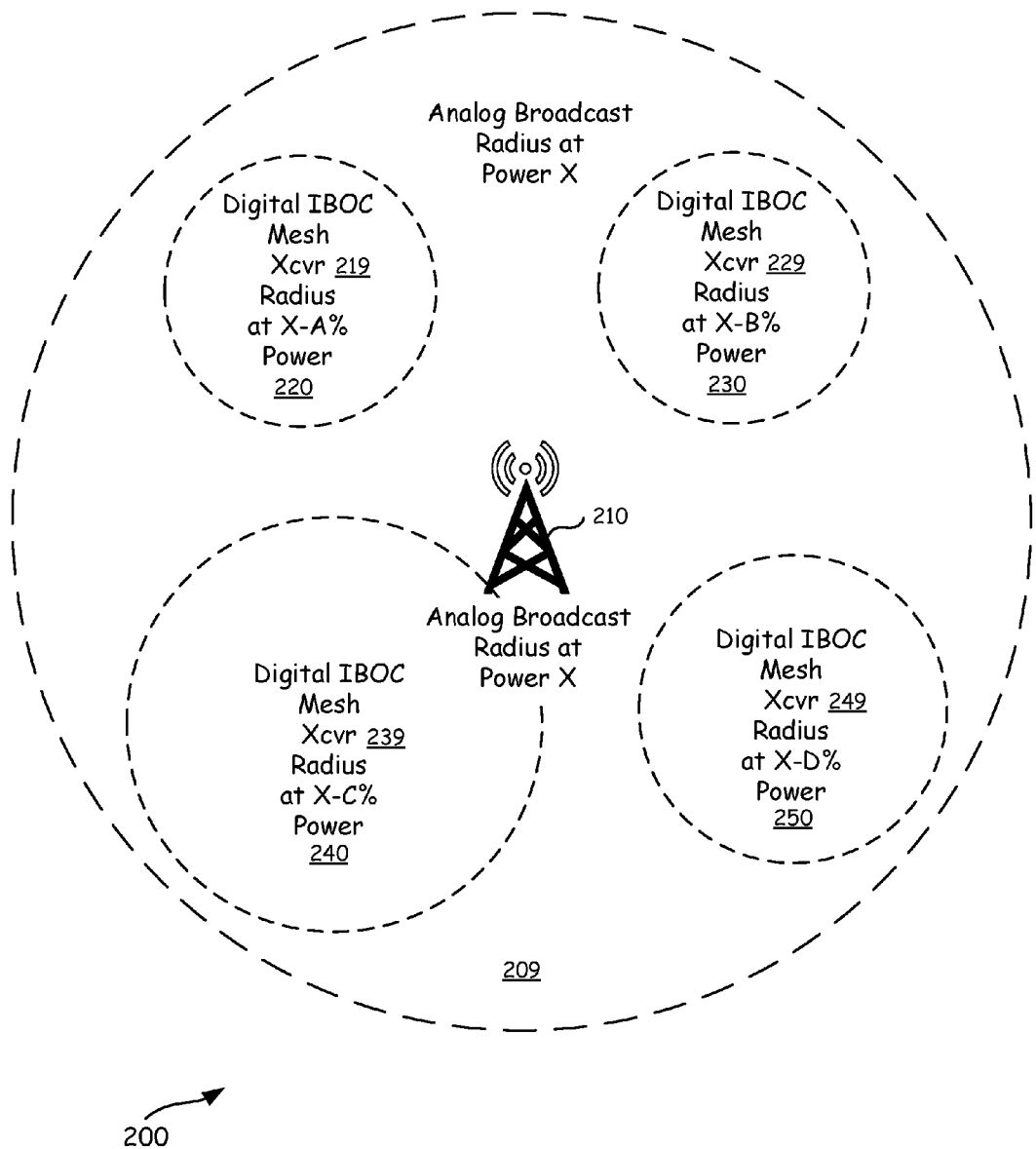
FIG. 2 is a diagram illustrating an IBOC broadcasting system using multiple mesh transceivers at different geographic locations, in accordance with various embodiments of the present disclosure.

Referring now to FIG. 2, an IBOC broadcasting system 200 using multiple mesh transceivers at different geographic locations, will be discussed in accordance with various embodiments of the present disclosure. As used herein, the term "mesh transceivers" refers to transceivers capable of IBOC broadcasting, and communicatively connected to establish a mesh network via wired communication links, wireless communication links, or both. The term "mesh network" refers to a network topology in which network nodes are interconnected, and relay data between and among the network nodes on behalf of the network.

IBOC broadcasting system 200 includes an over-the-air (OTA) analog broadcast transmitter 210 that transmits an analog broadcast signal at an analog power, X. In conventional analog frequency modulation (FM) radio broadcasting, the analog power X may be determined based on a maximum effective radiated power (ERP) established by regulatory agency rules, laws established by other local, regional, or national governing bodies, based on how much interference the analog FM radio broadcast causes, or the like.

For purposes of this discussion, it is assumed that analog power X is sufficient to provide acceptable reception by an analog receiver anywhere within analog broadcast radius 209. Furthermore, although analog broadcast radius 209 is illustrated as a circle for ease of discussion, those of ordinary skill in the art will understand that the analog broadcast signal generated by analog broadcast transmitter 210 is very unlikely to actually propagate in a purely circular pattern due to myriad factors, including antenna type and configuration, and environmental factors such as weather, foliage, buildings, and geographic topology.

IBOC broadcasting system 200 also includes mesh transceivers 219, 229, 239, and 239, connected together via wireless, wired, or both wired and wireless communication channels to form a mesh network. Mesh transceivers 219, 229, 239, and 239 each include an in-band on-channel (IBOC) transmitter that broadcasts digital content in one or more sidebands of the analog channel used by OTA analog broadcast transmitter 210 to transmit its analog broadcast signal. In contrast to conventional systems, the network of mesh transceivers 219, 229, 239, and 239 are positioned at geographic locations different from the geographic location of OTA analog broadcast transmitter 210. Mesh transceivers 219, 229, 239, and 239 each broadcast digital content from their various different geographic locations, using their own IBOC transmitters, at IBOC power levels related to the analog power X of OTA analog broadcast transmitter 210.

In various embodiments, the power level used by each of the mesh transceivers 219, 229, 239, and 239 can be individually determined as a percentage, or other portion, of the analog power X used by OTA analog broadcast transmitter 210. For example, mesh transceiver 219 can be assigned to use an IBOC power level of X-A % of the analog power X used by OTA analog broadcast transmitter 210, resulting in first IBOC broadcast radius 220. Similarly, mesh transceiver 229 can be assigned to use an IBOC power level of X-B %, resulting in second IBOC broadcast radius 230; mesh transceiver 239 can be assigned to use an IBOC power level of X-C %, resulting in third IBOC broadcast radius 230; and mesh transceiver 249 can be assigned to use an IBOC power level of X-D %, resulting in fourth IBOC broadcast radius 250.

Figure 1:
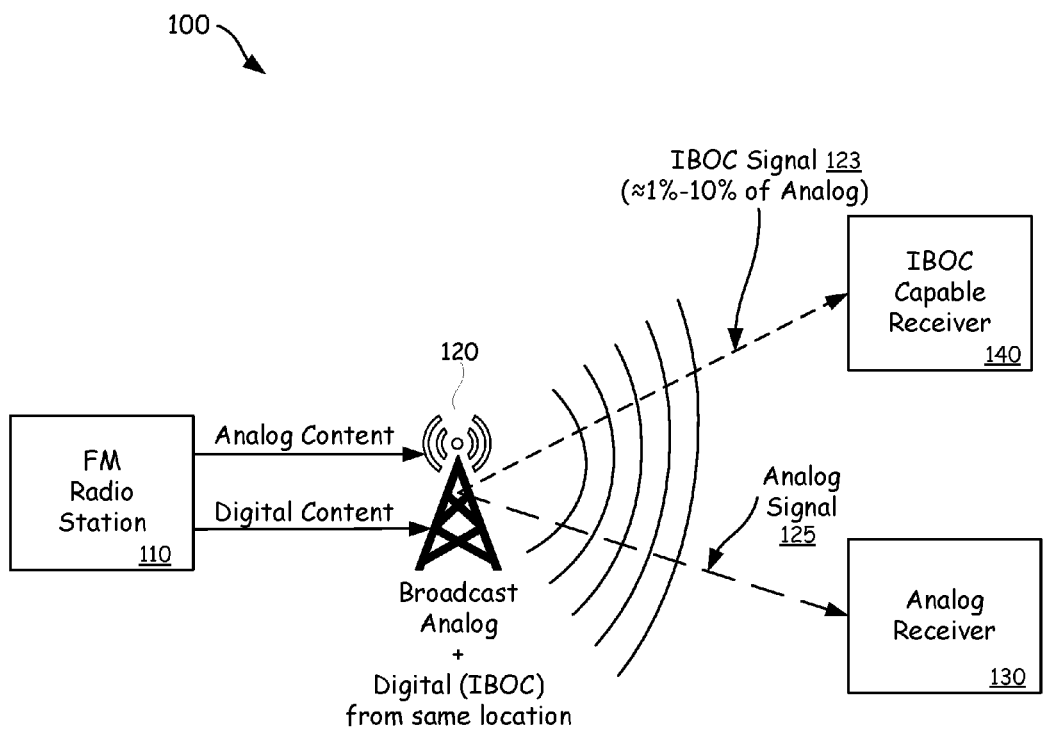
FIG. 1 is diagram illustrating the prior-art technique of broadcasting a digital signal in-band on-channel (IBOC) from the same location used to broadcast the analog signal.

In at least one embodiment the various IBOC power levels can be set to correspond to the IBOC power that would have resulted from use of prior art system 100 (FIG. 1), in which the IBOC broadcast is transmitted from the same location as the analog signal. For example if the IBOC signal strength in a conventional IBOC broadcast would be limited to 5% of the power of the analog broadcast signal, variables A, B, C, and D can all be set so that the IBOC transmit power of each of the mesh transceivers 219, 229, 239, and 249 is 5% of the analog power X used by OTA analog broadcast transmitter 210. For example, if the analog power X used by OTA analog broadcast transmitter 210 is 100 KW Effective Radiated Power (ERP), mesh transceivers 219, 229, 239, and 249 can each be set to transmit at 5 KW ERP.

In some embodiments, a signal strength can be measured at mesh transceivers 219, 229, 239, and 249, and that signal strength measurement can be used to estimate the analog power X used by OTA analog broadcast transmitter 210. The estimated analog power X can then be used as the baseline, and the IBOC transmit power can be set to a particular percentage of the estimated analog power X.

In some embodiments, rather than estimating the analog transmit power at the location of the analog transmission, a signal strength measurement can be used to determine a hypothetical analog transmission power that would have resulted in a signal having the measured signal strength, if the analog signal had been broadcast from the same geographic location as the mesh transceiver at which the signal strength measurement was performed. For example, if the signal strength measurement indicated that an analog transmitter would need a hypothetical transmission power of 50 KW ERP if the analog transmitter were transmitting from the location of the mesh transceiver 239, then the IBOC transmission power of mesh transceiver 239 could be set to 2.5 KW ERP, continuing to assume a 5% ratio.

Note that as used herein within the context of the ratio of IBOC transmit power to analog transmit power, reference to "analog power X" is used to refer to an actual analog broadcast power determined at the transmitter, to an estimated analog transmission power determined by a power measurement performed at a mesh transceiver, and to a hypothetical analog transmission power As used herein, reference to "analog power X" can also refer to the hypothetical analog transmission power. Further note that although ERP is discussed as the unit of transmit power measurements, other units of transmission power known to those of skill in the art can be used. Furthermore, although percentages are discussed herein, other expressions of the same relationship apply equally to various embodiments set forth herein. For example, rather than expressing a ratio as a percentage, a logarithmic expression, such as dB, can be used in describing the relationship between IBOC transmit power and analog transmit power.

Some implementations involve an overlap of IBOC transmissions from multiple mesh receivers, for example if IBOC broadcast radius 230 overlapped IBOC broadcast radius 250 (not illustrated), the IBOC transmit power of mesh transceivers 229 and 249 can be set so that their combined IBOC transmit power does not exceed the allowed portion, in this example 5%, of analog power X used by OTA analog broadcast transmitter 210. In some such embodiments, the IBOC transmit power of mesh transceivers 229 and 249 can be set so that their combined IBOC signal strength within the overlapping area does not exceed the allowed portion of analog power X, even though mesh transceivers 229 and 249 are each set to have an IBOC transmit power of 4% of analog power X. However, due to attenuation of the broadcast signal, the IBOC signal strength in the overlapping area may be equivalent to only a 5% IBOC transmit power ratio if the IBOC transmitter were considered to be originating with the overlap area.

Mesh transceivers 219, 229, 239, and 239 can be distributed at substantially any location corresponding broadcast area served by OTA analog broadcast transmitter 210. Furthermore, although the only mesh transceivers illustrated are mesh transceivers 219, 229, 239, and 239, in various embodiments there can be hundreds or even thousands of mesh transceivers distributed around a broadcast area. The mesh transceivers can be evenly or unevenly distributed about a broadcast area, with different mesh transceivers having different IBOC transmit powers depending on a desired coverage area, and subject to the transmit power relationship to the analog transmission power.

Depending on the configuration of the mesh transceivers and their physical proximity to each other, the IBOC transmit power can be determined based not only on the analog transmit power, but also based on the IBOC transmit power of neighboring mesh transceivers. Additionally, the IBOC transmit power of any particular mesh transceiver can be set, based at least in part, on the proximity to of the mesh transceiver to the analog transmitter. This can be done, for example, using an estimated or a hypothetical analog transmission power based on a signal strength measurement local to the mesh transceiver or a collocated analog antenna, or by using a known location of the mesh transceiver and the analog transmitter to estimate how much to the IBOC transmit power needs to be adjusted to maintain a required relationship to the analog transmit power.

Figure 3:
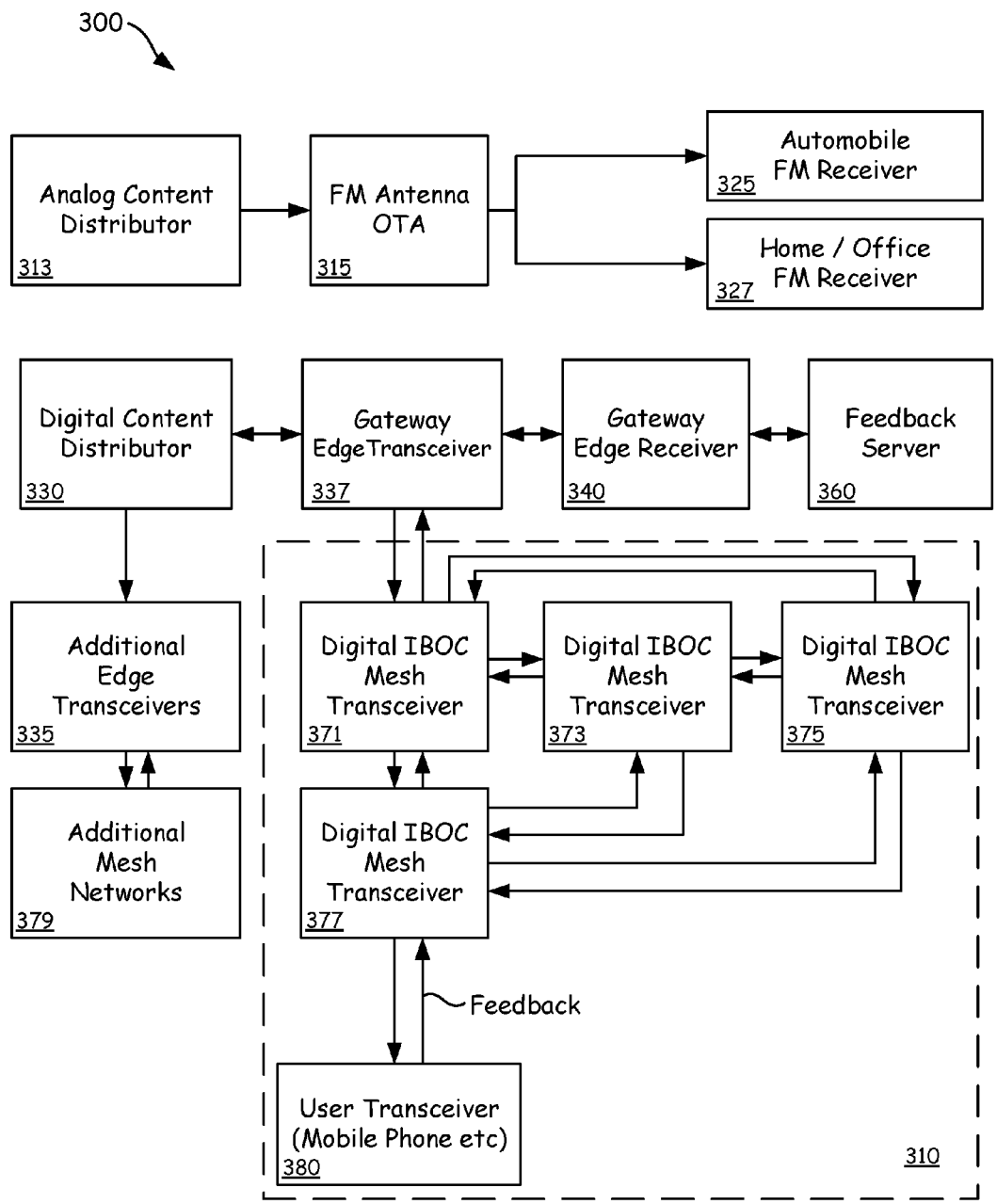
FIG. 3 is a block diagram illustrating an IBOC broadcasting system including a mesh IBOC transceiver network, according to various embodiments of the present disclosure.

Referring next to FIG. 3, an IBOC broadcasting system 300 including a mesh IBOC transceiver network will be discussed according to various embodiments of the present disclosure. IBOC broadcasting system 300 includes analog content distributor 313, FM OTA antenna 315, automobile FM receiver 325, home/Office FM receiver 327, digital content distributor 330, edge transceiver 337, gateway edge receiver 340, feedback server 360, mesh network 310, which includes digital IBOC mesh transceivers 371, 373, 375, and 377, user transceiver 380, additional edge transceivers 335, and additional digital IBOC mesh networks 379.

In operation, analog content distributor 313 delivers content to FM OTA antenna 315 for analog broadcast, and FM OTA antenna 315 broadcasts the analog content for reception by automobile FM receiver 325 and Home/Office FM receiver 327. Digital content distributor 330 delivers content for digital IBOC transmission via mesh network 310. The content delivered by digital content distributor 330 can be the same or different content than content deliver by analog content distributor 313 to FM OTA antenna 315.

Digital content distributor 330 can transmit, to edge transceiver 337, content to be delivered for IBOC broadcast via mesh network 310. Edge transceiver 337 can control delivery of the content to mesh network 310 by transmitting the content to one or more digital IBOC mesh transceivers 371, 373, 375, and 377, which are connected to each other in a mesh configuration via one or more wireless or wired communication channels. The communication channels used for communications by edge transceiver 337, and mesh transceivers 371, 373, 375, and 377, can include wired networks, and/or any of various wireless communication channels such as an 802.11 wireless local area network (LAN) channel, a sideband also being used for IBOC broadcasting, a Bluetooth communication channel, or any other suitable wireless in the analog channel used by FM OTA antenna 315. For example, a frequency sharing protocol such as time division multiple access (TDMA) can be used to allow IBOC broadcast of content during some of the time slots, and communication between nodes of mesh network 310 using the IBOC channel during time slots not used to broadcast the content provided from edge transceiver 337.

Content information delivered to any single mesh transceiver 371, 373, 375, or 377 can be transmitted to any or all other mesh transceivers 371, 373, 375, or 377 included in mesh network 310. Thus, in at least some embodiments, edge transceiver 337 need only deliver content to mesh transceiver 371, mesh transceiver 371 can forward the content to mesh transceivers 373 and 377, and so on, with each mesh transceiver further transmitting the content within mesh network 310, as required depending on the communication protocol used. For example, mesh network 310 can employ various addressing techniques in some embodiments, while in other embodiments flood techniques are used to move information within mesh network 310.

Mesh network 310 can also be used to carry information in addition to IBOC broadcast content. For example, mesh transceivers 371, 373, 375, or 377 can provide edge transceiver 337 with signal power levels, transmission power levels, estimated transmission power levels, hypothetical transmission power levels, measurements that can be used by edge transceiver 337 to calculate or estimate these power levels, and other information related to IBOC transmissions and useful to edge transceiver 337 in implementing various embodiments of the present disclosure. For example, mesh network 310 can be used to carry status information for mesh transceivers 371, 373, 375, or 377, including operational status of the mesh transceiver, operational status of an IBOC transmitter used for IBOC broadcasts by the mesh transceiver, signal measurements relating to measured or calculated IBOC broadcast characteristics of other mesh transceivers, information related to a communication channel used to transmit control information among mesh transceivers 371, 373, 375, or 377, or the like.

Mesh network 310 can also be used to carry user feedback received from user transceiver 380. For example, user transceiver 380 can be used to receive one or more IBOC broadcasts provided by mesh network 310. A user can interact with user transceiver 380 to transmit feedback related to the IBOC broadcast to mesh network 310 via mesh transceiver 377. The user feedback can include, for example, user preferences or opinions regarding the IBOC content, including user evaluations of usefulness, timeliness, appropriateness, subjective value of the content to the listener, likes, dislikes, suggestions regarding future content, location, or other similar feedback.

The user feedback delivered to mesh transceiver 377 can be moved through mesh network 310 and transmitted to edge transceiver 337 for delivery to feedback server 360 via gateway edge receiver 340. Feedback server 360 can be associated with a radio station or network operations center from which the IBOC content originated. In some embodiments, the feedback server can be associated with a third party rating service that collects and analyzes user feedback to provide advertisers or broadcasters with market intelligence.

In some embodiments, user feedback can include registration information, such as a user or device identifier, which can be used to register a user's device with mesh network 310. A user or device identifier can include, for example, an external security manager (ESM) identifier, a media access control MAC address, a user name, an account number, or another suitable identifier. In some embodiments, the user feedback is delivered to edge transceiver 337, which can register a particular user or device with mesh network 310. In some embodiments, a particular mesh transceiver can be provided with customized content for digital IBOC broadcast when a registered device or user is currently in communication with that particular mesh transceiver.

In some embodiments, user transceiver 380 can include a digital FM IBOC receiver capable of receiving either or both analog FM analog transmissions, and digital IBOC transmissions. In common vernacular, the user transceiver 380 can include an "HD" radio receiver. User transceiver 380 can, in some implementations, provide feedback to mesh transceiver 377 via a cellular transceiver, via a wireless LAN transceiver included in user transceiver 380, or in some cases via a wired LAN or wide area network (WAN).

For example, mesh transceiver 377 can, in some embodiments, be incorporated into a gateway/router such as those commonly used to connect home or business networks to the Internet. Consider an implementation in which mesh transceiver 377 is included in a router used by a coffee shop, and that multiple customers employ an IBOC capable device to receive the IBOC broadcast transmitted by mesh transceiver 377. Mesh transceiver 377 can receive content for IBOC broadcast from edge transceiver 337, via mesh network 310, and transmit that content via an IBOC broadcast at the coffee shop. One of the customers can use his IBOC capable device, for example user transceiver 380, to provide user feedback to edge transceiver 337, via mesh network 310. Edge transceiver 337 can forward the user feedback from user transceiver 380, via gateway edge receiver 340 or otherwise, to feedback server 360 for analysis and/or distribution.

The content of the IBOC broadcast transmitted by mesh transceivers 371, 373, 375, and 377 is, in some embodiments, the same content across the entire mesh network 310. In other embodiments, however, individual mesh transceivers can broadcast different content, so that some mesh transceivers of mesh network 310 IBOC broadcast first content, while other mesh transceivers in mesh network 310 IBOC broadcast second content, different from the first content. In at least one such embodiment, the entire mesh network 310 can carry, forward, and otherwise move user feedback from any user, regardless of the IBOC broadcast to which the user feedback is related.

Furthermore, one or more mesh transceivers included in mesh network 310 can be used to transmit different data in different sidebands of the same channel, different data in the same sideband of the same channel, or the same data in different sidebands of the same channel. In other implementations all of the mesh transceivers 371, 373, 375, and 377 in mesh network 310 broadcast the same content using the same sideband of the same channel, and additional edge transceivers 335 are used in conjunction with additional mesh networks 379 for transmission of different data, or for transmission of the same data in different sidebands of the same channel.

Various types of content, including non-traditional FM radio content, can be IBOC broadcast via mesh network 310. For example, mesh network 310 can include hundreds of mesh transceivers positioned in a one to one correspondence with parking spaces in a parking garage. Each mesh transceiver can include a proximity sensor to indicate when a parking space is occupied, and be set to broadcast IBOC content at a very low power. In a particular implementation, each mesh transceiver can wireless transmit a feedback signal to an edge transceiver, either directly or indirectly via the mesh network. The feedback signal can include information indicating whether or not a parking space associated with a particular mesh transceiver is currently available. The edge transceiver can process the feedback signal from all of the mesh transceivers, and generate an announcement to be IBOC broadcast by some or all of the mesh transceivers, for example, "Four spaces available on level 4 East." The edge transceiver can also, in some embodiments forward the feedback to a feedback server 360, which can process the information and send it to a digital content distributor 330, which can generate a parking message. The parking message can then be transmitted to edge transceiver 337 for delivery to mesh network 310, and subsequent digital IBOC broadcasting.

In some embodiments, traditional FM radio content can also be IBOC broadcast by mesh transceivers 371, 373, 375, and 377 included in mesh network 310. The FM radio content can be a duplicate of the analog FM radio content broadcast by FM OTA antenna 315. In other implementations, portions of the content between the analog broadcast and the IBOC broadcast based on various factors such as anticipated listener demographics and the location of the mesh network. For example, an IBOC mesh network located in one part of a city can be used to broadcast traffic information pertinent to part of the city where the mesh network is located, with the traffic information being different from that broadcast by a second IBOC mesh network located in a different part of the city. As another example, an IBOC mesh network located in a shopping mall can be used to broadcast advertisements specific to that mall, while an IBOC mesh network in the parking lot of the mall can be used to broadcast weather and traffic information. Note that in these examples, the IBOC mesh networks may each be transmitting in the same sideband of the same analog channel, so that a user employing a transceiver tuned to an IBOC station would not need to re-tune his transceiver, but would still receive different information based on which part of the city he was in, or based on whether he was inside the shopping mall or in a parking lot. In other embodiments, different sidebands could be used, and in some instances a mesh transceiver can be configured to digitally IBOC broadcast on two sidebands of the same analog FM channel concurrently.

Figure 4:
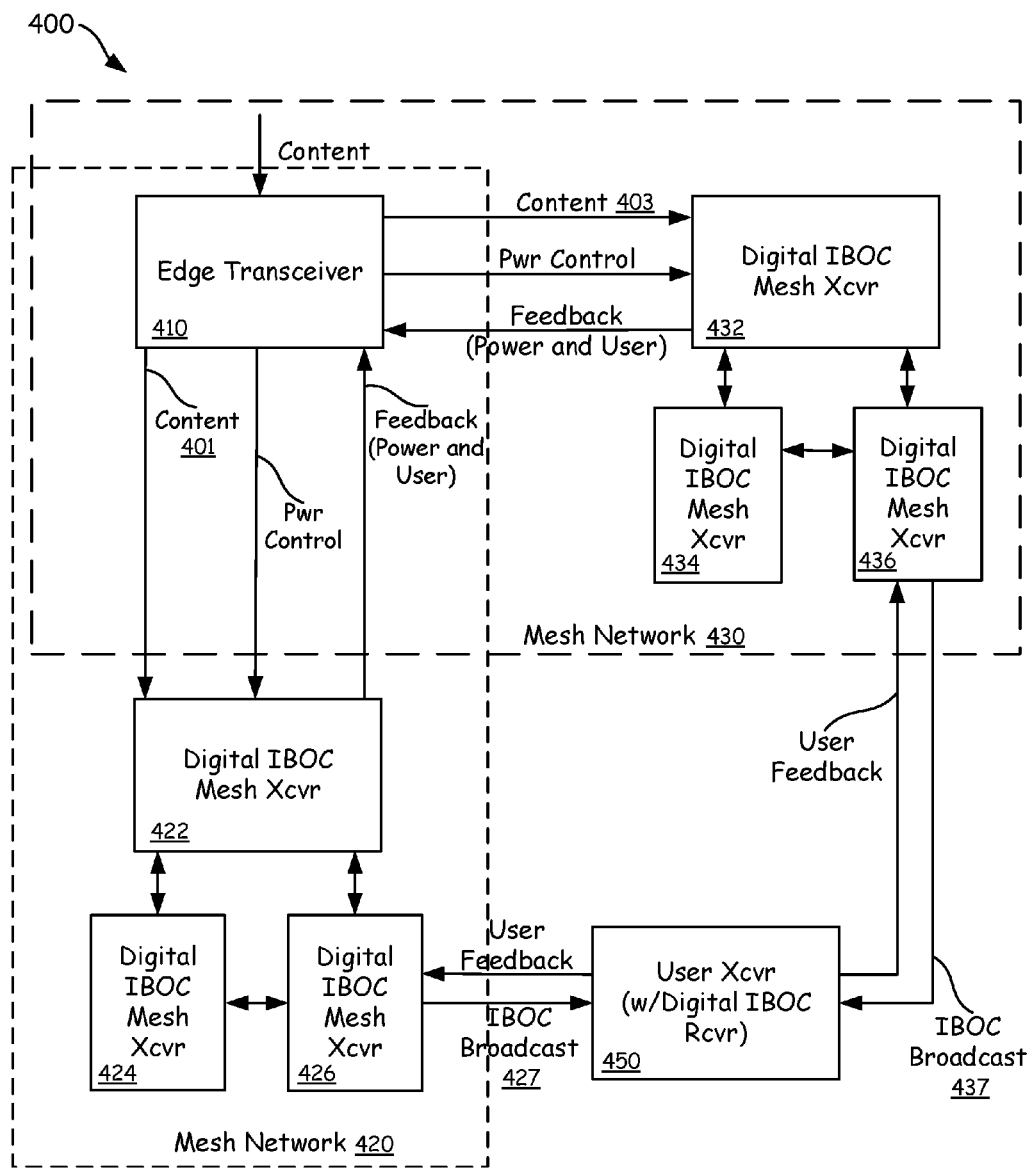
FIG. 4 is a block diagram illustrating an edge transceiver serving multiple mesh networks, according to various embodiments of the present disclosure.

Referring next to FIG. 4 a system 400 including an edge transceiver serving multiple mesh networks is illustrated according to various embodiments of the present disclosure. System 400 includes mesh networks 420 and 430, which can include any number of mesh transceivers that transmit digital content in an IBOC broadcast using one or more sidebands in the same channel used to transmit an analog FM broadcast signal. Mesh network 420 includes edge transceiver 410 connected to mesh transceiver 422 via one or more communication channels allowing bi-directional communication. Mesh transceiver 422 is connected to mesh transceivers 424 and 426 via one or more communication channels allowing bi-directional communication. Edge transceiver 410 is, in various embodiments, also part of mesh network 430, and is connected to mesh transceiver 432 via one or more communication channels allowing bi-directional communication. Mesh transceiver 432 is connected to mesh transceivers 434 and 436 via one or more communication channels allowing bi-directional communication.

Edge transceiver 410 can receive content to be transmitted via an IBOC broadcast by mesh transceivers included in mesh networks 420 and 430. In some embodiments, Edge transceiver 410 delivers the same content to both mesh network 420 and mesh network 430. In other embodiments content 401 and content 403 are different from each other. Regardless of whether content 401 and 403 are the same or different, mesh network 420 can transmit content 401 via IBOC broadcast 427 and mesh network 430 can transmit content 403 via IBOC broadcast 437. IBOC broadcasts 427 and 437 can be made in the same or in a different sideband of the channel used for analog FM transmission.

User transceiver 450 can receive either or both IBOC broadcast 427 from mesh network 420 and IBOC broadcast 437 from mesh network 430, and provide user feedback related to any received IBOC broadcast. In some embodiments, mesh networks 420 and 430 are neighboring networks, and are located so that at least one mesh transceiver included in mesh network 420 is geographically adjacent to at least one mesh transceiver included in mesh network 430. In some implementations, especially where mesh transceivers included in mesh networks 420 and 430 are transmitting IBOC broadcasts using the same sideband or sidebands adjacent to each other in frequency, the IBOC transmission power of one or both mesh receivers can be set even lower than would otherwise be permissible based on a relationship to the transmission power of the analog FM broadcast in that channel. For example, if both mesh transceiver 424 and mesh transceiver 434 are adjacent to each other and broadcasting at permissible IBOC power levels of 1% of analog broadcast power, the 1% IBOC power level could still be high enough to cause interference between IBOC broadcast 427 and IBOC broadcast 437. In such a case, an attempt to reduce the interference could include reducing the IBOC power levels of both mesh transceiver 424 and mesh transceiver 434 to 0.8% of analog broadcast power.

Similar issues relating to digital IBOC broadcast levels can occur between mesh transceivers within a single mesh network. For example, if mesh transceivers 434 and 436 are geographically adjacent to each other the IBOC power of either or both mesh transceivers 434 and 436 can be adjusted to provide the strongest IBOC broadcast power allowed, while still keeping interference between IBOC broadcasts at an acceptable level. In some instances, the timing of IBOC broadcasts transmitted by mesh transceiver 434 and 436 can also be adjusted to aid in dealing with interference issues.

In various embodiments, edge transceiver 410 sends power control signals to set the IBOC broadcast power of mesh transceivers included in mesh networks 420 and 430. The power control signals can be addressed to individual mesh transceivers, so that the power level of mesh transceivers can be individually controlled. In other embodiments, the power level of all mesh transceivers can be set to the same value by a power control signal. In yet further embodiments, the IBOC transmission power of all mesh transceivers in a mesh network can be set to a single default value, and the IBOC power level of individual mesh transceivers can be adjusted as necessary. Adjusting a default value can be used, in some implementations, to adjust the IBOC transmission power of mesh transceivers located near geographic boundaries of a mesh network.

In various embodiments, individual mesh transceivers can perform signal strength measurements and transmit information relating to those measurements to edge transceiver 410 directly, or via other mesh transceivers included in the mesh network. For example, mesh transceivers 426, 424, 422, 436, 434, and 432 can each measure one or more analog or digital signal strengths, and transmit power feedback related to the signal strength measurements to edge transceiver 410. Power feedback can include information indicating a signal strength of the analog FM broadcast signal on the relevant channel, that is to say the signal strength of the analog broadcast signal on the channel including the sidebands used by the mesh transceiver to transmit the IBOC broadcast.

Power feedback can also include a partial or full calculation or estimate of various IBOC power ratios, such as the following: 1) a calculated or estimated ratio of the analog broadcast power at the analog transmission site to an IBOC power level at the mesh transceiver; 2) a calculated, measured, or estimated ratio of the analog power level as determined based on signal strength of the analog signal at the mesh transceiver and an IBOC power level as determined at the mesh transceiver; 3) a hypothetical ratio of the analog power to an IBOC power level, where the analog power is determined based on a hypothetical transmission power of a hypothetical analog transmitter collocated with the mesh transmitter and determined based on an analog signal strength measurement at the mesh transceiver; 4) power measurements or estimates of IBOC signal power of geographically adjacent mesh transmitters; 5) feedback from user devices indicating signal quality at the user devices; 6) signal quality metrics indicating potential interference from geographically near or adjacent mesh transceivers; and 7) information related to IBOC power calculations and ratios that can be used by edge transceiver 410 to perform any or all of the partial or full calculations or estimates of various IBOC power ratios for individual mesh transceivers.

Edge transceiver 410 can also receive information related to the transmission power of the analog broadcast from a broadcaster, from an analog broadcast facility itself, or from some other source. This information can be received in near-real time, and edge transceiver 410 can use that information in conjunction with the power feedback received from the individual mesh transceivers to determine an IBOC transmission power for any or all mesh transceivers included in one or more mesh networks. Edge transceiver 410 can transmit the determined IBOC transmission powers in one or more power control messages delivered into the mesh networks.

Figure 5:
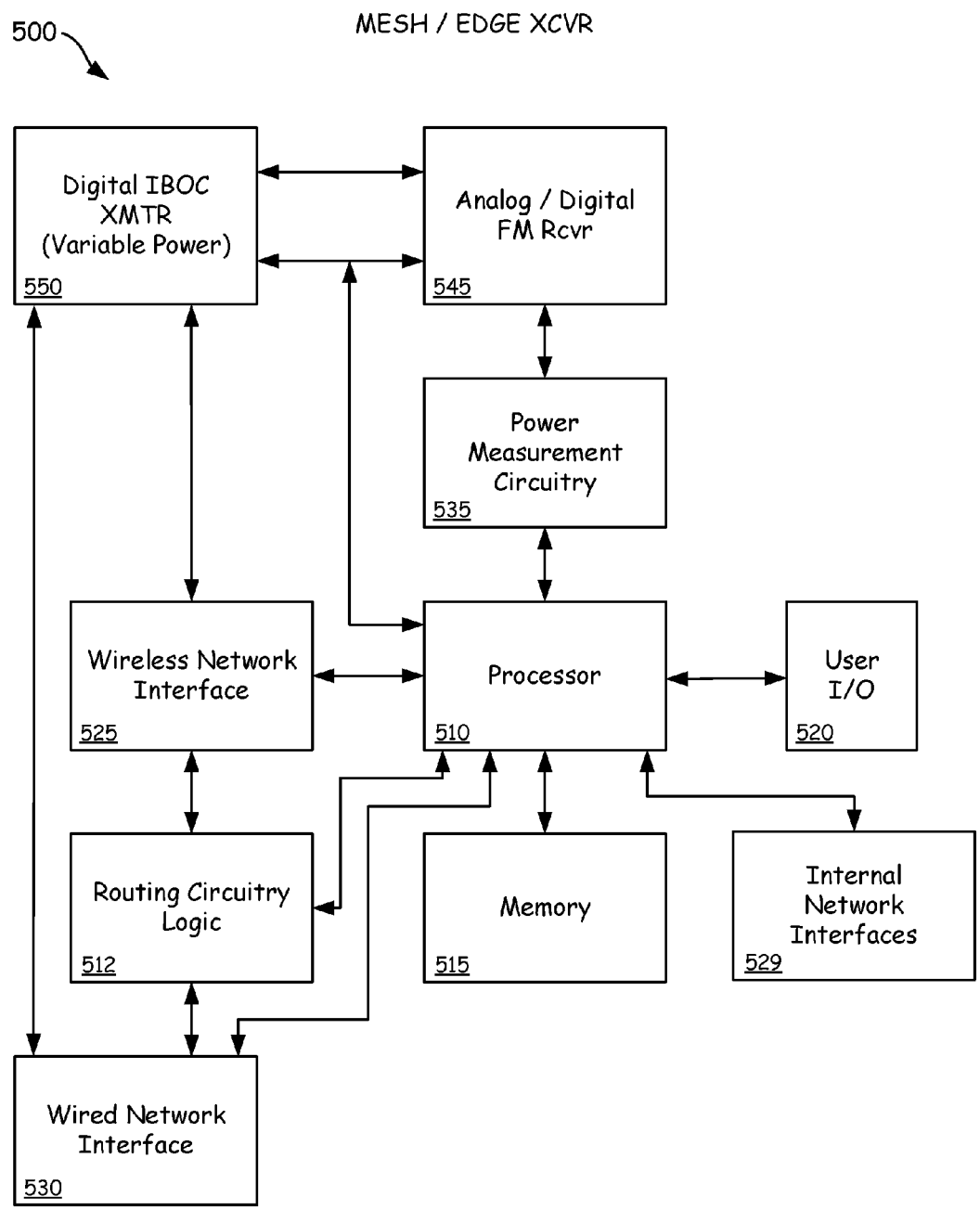
FIG. 5 is a block diagram illustrating a mesh or edge transceiver, according to various embodiments of the present disclosure.

Referring next to FIG. 5, a mesh/edge transceiver 500 is illustrated according to various embodiments of the present disclosure. In various embodiments, the mesh transceivers and edge transceivers can have a similar architecture that includes a processor 510, memory 515, user input/output devices 520, routing circuitry/logic 512, wireless network interface 525, wired network interface 530, internal network interfaces 529 analog/digital FM receiver 545, power measurement circuitry 535, and a variable-power IBOC transmitter 550.

For implementations where mesh/edge transceiver 500 is configured as a mesh transceiver, IBOC transmitter 550 can digitally transmit content in-band and on-channel (IBOC) in a sideband of a radio channel used to transmit an analog FM radio broadcast under control of processor 510. The content broadcast by IBOC transmitter 550 can be received via wireless network interface 525, for example from a wireless local area network (WLAN); via wired network interface 530, for example from a local area network (LAN); or from a digital FM receiver configured to receive content over an IBOC sideband.

Either or both wireless network interface 525 and wired network interface 530 can be connected to other mesh transceivers in a mesh configuration, to allow communication directly with the other mesh transceivers without requiring a router, hub, gateway, or other similar device. In some embodiments the mesh network can be considered to be a type of ad-hoc network in which each mesh transceiver included in a mesh network can communicate directly with any other mesh transceiver in the mesh network. In other embodiments, however, wireless network interface 525 and wired network interface 530 can be connected to a limited number of other mesh transceivers. For example, in some embodiments, any particular mesh transceiver can be connected to no more than 2, 3, or 4 other mesh transceivers, which are often, though need not be limited to, geographically adjacent mesh transceivers.

In some embodiments, one or both of network interface 525 and wired network interface 530 are connected to an edge transceiver in addition to being connected to geographically adjacent mesh transceivers. In some cases, the edge transceiver uses one of the available "connection slots," that would otherwise be used for connecting to other mesh transceivers. In at least one embodiment, the wireless network interface 525 can use a time division multiple access (TDMA) or other frequency sharing scheme, such as code division multiple access (CDMA) to allow multiple communication connections using a single interface. In other implementations, wireless network interface 525 can be set to a specific frequency that can be used to communicate with another mesh transceiver that also has its wireless network interface set to the same specific frequency. Yet further embodiments can include a dedicated interface for each communication connection with other mesh transceivers or an edge transceiver.

In various embodiments, analog/digital FM receiver 545 can be set to receive IBOC transmission in a shared sideband, and communications between mesh/edge transceiver 500 and other mesh/edge transceivers can be performed using a combination of analog/digital FM receiver 545 and IBOC transmitter 550.

Mesh/edge transceiver 500 can use power measurement circuitry 535 to measure a signal strength or other indication of transmission power associated with either a digital IBOC signal or an analog signal received using analog/digital FM receiver 545. Information associated with these measurements can be transmitted to an edge transceiver tasked with managing the mesh network to which mesh/edge transceiver 500 belongs. This information is sometimes referred to herein as power feedback. The power feedback can include partially or fully processed information indicating a relationship between analog transmission power and IBOC transmission power.

An edge transceiver can use the power feedback, alone or in conjunction with other information, to determine an IBOC broadcast or transmission power to which IBOC transmitter 550 should be set. The determined IBOC broadcast power can be sent from the edge transceiver to mesh/edge transceiver 500, where processor 510 can store that information in memory 515 and use the IBOC broadcast power to set the power level for IBOC transmitter 550.

Where mesh/edge transceiver 500 is used as an edge transceiver, it may or may not include an IBOC transmitter 550, depending on whether or not communications with a mesh transceiver are performed using a shared IBOC sideband. Furthermore, power measurement circuitry 535 may or may not be included, again depending on whether or not the edge transceiver is used to perform either analog or IBOC power measurements.

In some embodiments, mesh/edge transceiver 500 can be implemented as a gateway or router, using routing circuitry/logic 512 to provide routing and firewall services typically found in commercially available gateways and routers. Content to be transmitted via an IBOC broadcast can be received via wireless network interface 525 or wired network interface 530, either of which can correspond to an outward facing network interface such as a wide area network interface. In some cases, a dedicated mesh interface (not illustrated) can be provided, or IBOC transmitter 550 can be used to provide dedicated communication within the mesh network using a shared sideband. Mesh/edge transceiver 500 can then receive feedback regarding the IBOC broadcast content from a user device connected to an internal network via internal network interfaces 529. For example, an edge transceiver or mesh transceiver included in a mesh network can transmit content to mesh/edge transceiver 500, which in turn broadcasts the content to a home user using IBOC transmitter 550. User feedback can be received mesh/edge transceiver 500 using internal network interfaces 529, and routed through the mesh network to the edge transmitter via routing circuitry/logic and wireless network interface 525 or wired network interface 530.

Figure 6:
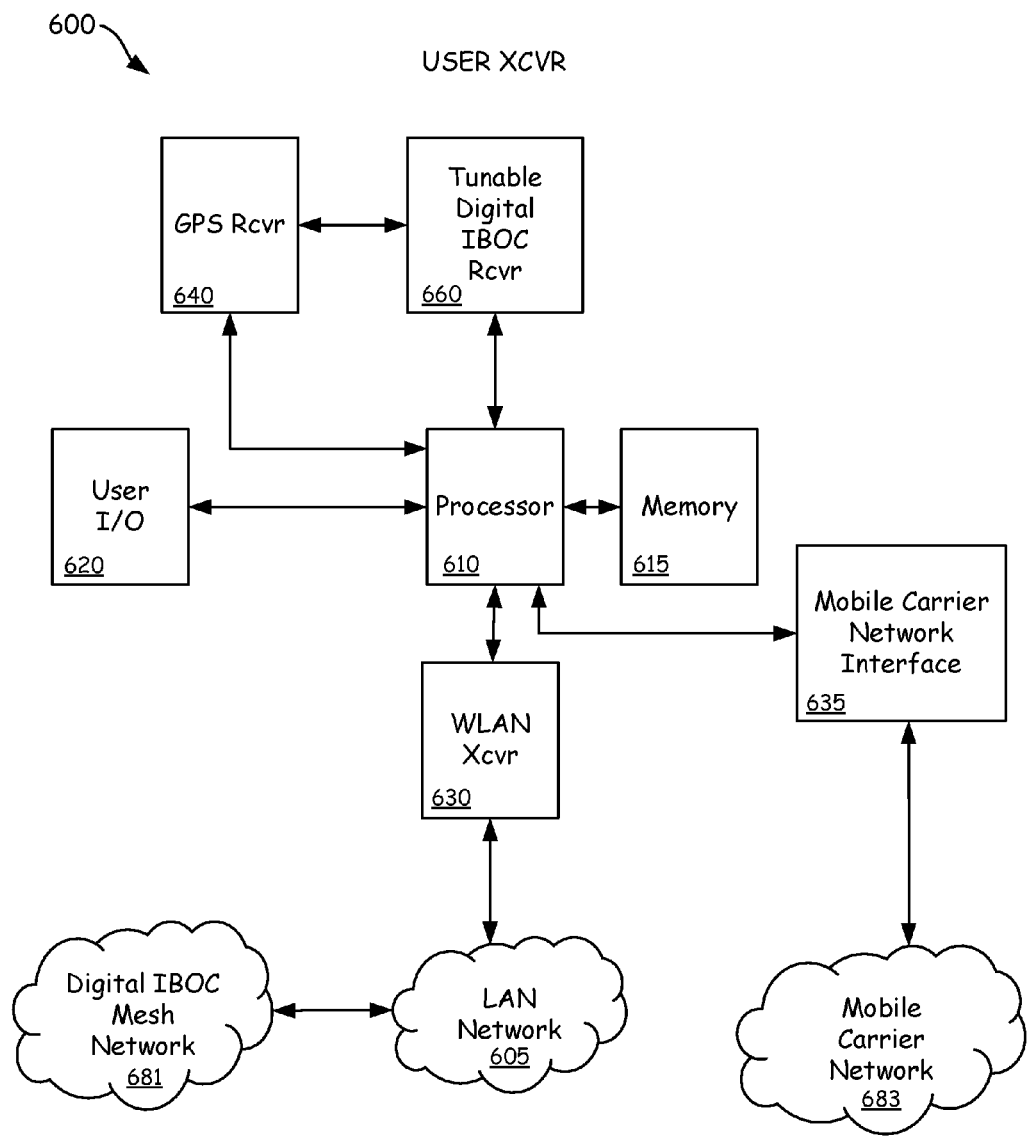
FIG. 6 is a block diagram of a user transceiver capable of receiving IBOC broadcasts and providing feedback regarding an IBOC signal broadcast by a mesh network, according to various embodiments of the present disclosure.

Referring next to FIG. 6 a user transceiver 600 capable of receiving IBOC transmission and providing feedback regarding an IBOC signal broadcast by a mesh network is illustrated according to various embodiments of the present disclosure. In some embodiments, user transceiver 600 includes processor 610, memory 615, user input/output devices 620, WLAN receiver 630 that can communicate with IBOC mesh network 681 via LAN network 605, global positioning satellite (GPS) receiver 640 that receives GPS timing signals used to determine geographic locations, tunable IBOC receiver 660, and mobile network interface 635 that provides telephone, messaging, and other communications via mobile carrier network 683.

In at least one embodiment, user transceiver 600 can be implemented as a mobile phone, tablet, computer, or other device including an IBOC receiver. User transceiver 600 can use tunable IBOC receiver 660 to receive an IBOC broadcast signal transmitted by a mesh transceiver included in IBOC mesh network 681. User input/output 620 can be used to present the content included in the IBOC broadcast signal for consumption by the user, for example by playing the content out via a speaker, presenting the content on a display screen, or some combination thereof. In various embodiments, the user can provide feedback regarding the presented content by entering user feedback information into user input/output 620. User transceiver 600 can transmit the user feedback information back to IBOC mesh network 681 via LAN network 605, using WLAN transceiver 630.

The user feedback information can include, but is not limited to, user content preferences, user opinions regarding whether the content is favorable to the user, a request for additional content, a request for less content, a request for different content, information indicating that an offer included in the content has been accepted or consumed (for example a parking space has been claimed), user location information based on coordinates determined using GPS receiver 640, user location information based on a user-identified location, information regarding reception quality of the IBOC broadcast signal (for example number of dropped packets and signal strength), identification of the IBOC station, and the like.

Figure 7:
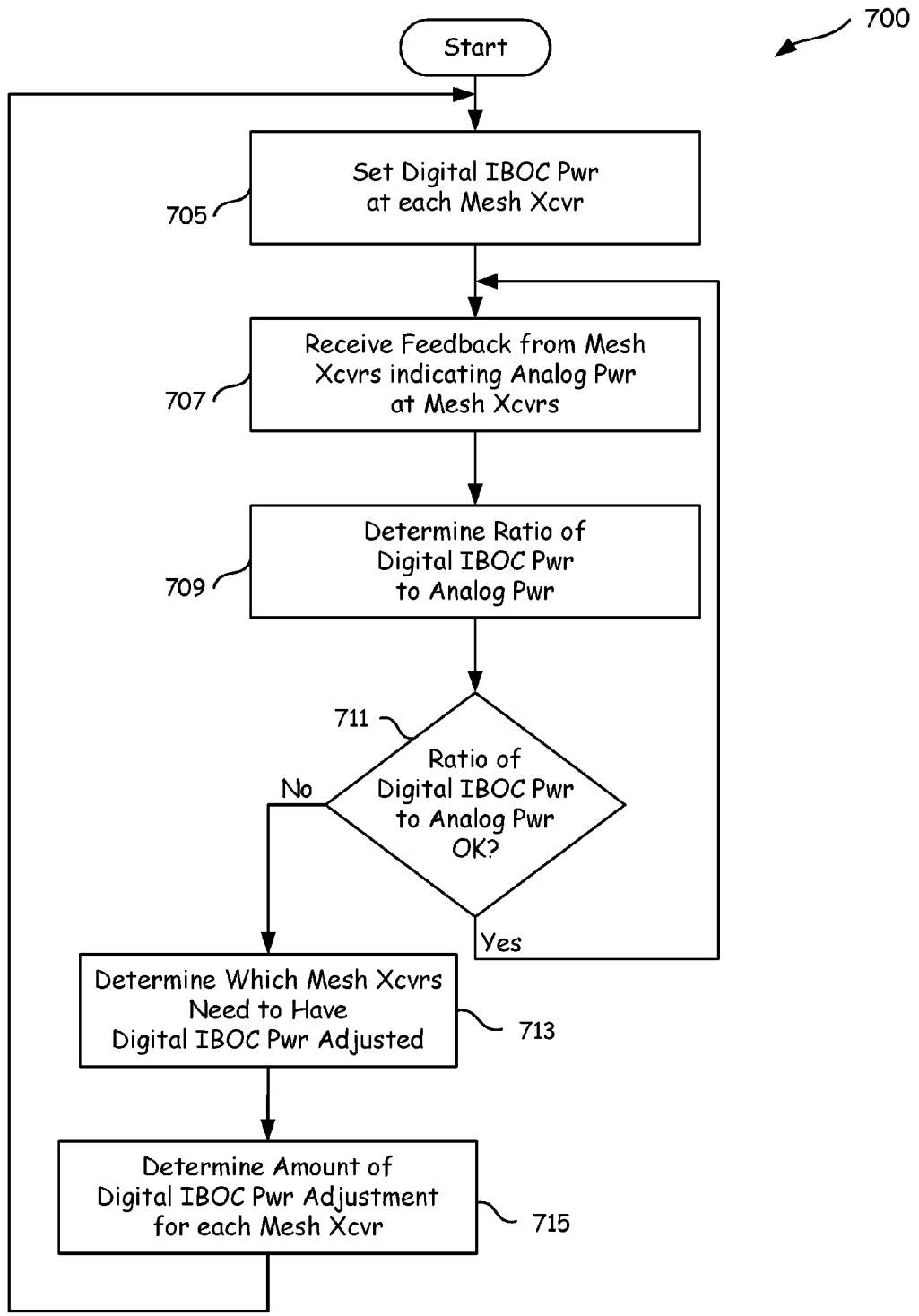
FIG. 7 is a flow chart illustrating a method of setting IBOC broadcast power for mesh-connected IBOC transceivers, and receiving feedback from a user receiving the IBOC broadcast, according to various embodiments of the present disclosure.

Referring next to FIG. 7 a method 700 of setting IBOC broadcast power for mesh-connected digital IBOC transceivers, and receiving feedback from a user consuming the digital IBOC broadcast, is illustrated and discussed according to various embodiments of the present disclosure. At block 705, the digital IBOC power at each mesh transceiver can be set to be a portion of the transmission power associated with an analog broadcast associated with the IBOC transmission. Recall that an IBOC transmission, sometimes referred to colloquially as an "HD" radio transmission, is a digital broadcast in a sideband of, and in the same channel used to transmit an analog broadcast signal. Thus, for example, if an FM radio station transmits an analog radio signal centered on the frequency 98.1 MHz, then the IBOC broadcast will take place a sideband of the 98.1 MHz in a 0.2 MHz wide channel. That is to say the sideband used by the digital IBOC broadcast signal can be between either 98.0 MHz-98.1 MHz, or between 98.1 MHz and 98.2 MHz. Thus, the analog signal broadcast at the nominal frequency of 98.1 MHz is considered to be the analog broadcast associated with the IBOC transmission in a sideband of the 98.1 MHz signal.

The relationship between the power of the analog signal and the digital IBOC signal usually requires the IBOC signal to be at a power level between about 1% and 10% of the associated analog signal, although these percentages depend on the mode in which the IBOC broadcast transmitter is operating, and on various other factors. In various embodiments, the power relationship between a mesh transceivers IBOC broadcast power and the associated analog signal can be limited to essentially the same percentages, but can also be dependent on the distance of the mesh transceiver from the analog transmitter.

In some instances, a mesh transceiver used in a mesh IBOC network can be assigned an IBOC broadcast power substantially different than would have otherwise been assigned if the mesh transceiver were collocated with the analog transmitter. The IBOC power at the mesh transceiver can be set, for example, to be a portion of the analog broadcast power at the originating analog antenna; to be a portion of an analog broadcast power that is estimated based on signal measurements made at the mesh transceiver; or to be a portion of the broadcast power of a hypothetical analog transmitter located at the same geographic location as the mesh transceiver, as opposed to where the analog transmitter is actually located. The IBOC power at any particular mesh transceiver can also be limited to mitigate interference with other mesh transceivers in the IBOC mesh network, or in neighboring IBOC mesh networks. In some embodiments, the IBOC broadcast power can be set individually for each mesh transceiver, or set to a mesh-wide default value.

In at least one embodiment, an edge transceiver in communication with at least one mesh transceiver included in an IBOC mesh network can transmit a power control signal to the mesh transceiver to which the edge transceiver is connected, and that control signal can be propagated throughout the IBOC mesh network, so that the IBOC broadcast power of each operating mesh transceiver in the mesh can be controlled by a single edge transceiver. Note that in some embodiments multiple edge transceivers can be used, and that a single edge transceiver can be connected to more than one mesh transceiver in a particular IBOC mesh network.

As illustrated at block 707, the edge transmitter that controls the IBOC power settings for an IBOC mesh can receive power feedback from the IBOC mesh. The power feedback can include measurements and other information indicating an analog power at each of the mesh transceivers included in the IBOC mesh. In some embodiments, information about one the signal level at one mesh transceiver can be verified, at least in part, using power measurements from nearby mesh transceivers, so that anomalous readings at any particular mesh transceiver can be filtered out. Additionally the power feedback received at the edge transmitter can also include IBOC power measurements associated with individual mesh transceivers.

As illustrated block 709, the edge transceiver can determine, based on the power feedback, the current ratio or relationship of IBOC transmission power to analog transmission power for each mesh transceiver in an IBOC mesh network. As illustrated at block 711, a check is performed to determine if the ratio or relationship determined at block 709 is acceptable.

Note that in some embodiments, if the analog power measurements received from the mesh transceivers indicate that the analog transmitter may be malfunctioning, a previous value, or a default value, of analog transmission power can be used by the edge transmitter in determining the ratio of IBOC power to analog power, or in determining if the power ratio or relationship is acceptable.

In at least one embodiment, an acceptable ratio for one mesh transceiver can be different from an acceptable ratio for another mesh transceiver. For example, for a mesh transceiver located at a position geographically closer to the associated analog transmitter it might be acceptable to assign an IBOC broadcast power that is 2% of the actual analog transmission power, as determined at the analog transmitter. But a mesh transceiver farther away from the analog transmitter might require an IBOC broadcast power that is only 1% of the actual analog transmission power as determined at the analog transmitter.

In other embodiments, the edge transceiver can determine that multiple mesh transceivers should be assigned the same acceptable IBOC-to-analog power ratio. For example, if the IBOC broadcast is allowed by regulation to have a maximum ratio of 4%, then that ratio of 4% could be implemented by spreading the IBOC mesh network across the reception area of the analog transmitter, with each mesh transmitter being assign the same 4% power ratio, so that the 4% maximum ratio was not exceeded.

If it is determined at block 711 that all of the mesh receivers in a mesh network are operating with an acceptable IBOC to analog power relationship, blocks 707-711 can be repeated. If any of the mesh transceiver in the mesh network are not operating at an acceptable IBOC to analog power ratio, the edge transceiver can determine which mesh transceivers need to be adjusted, as illustrated at block 713. For the mesh transceivers that require IBOC power adjustment, the edge transceiver can determine the amount and direction of power adjustment, as illustrated at block 715. After the proper IBOC broadcast power adjustments have been determined, the edge transceiver can transmit a power control signal or message to instruct the appropriate transceivers to adjust their IBOC broadcast power, as illustrated at block 705. In various embodiments, method 700, or portions thereof, can be repeated on a continuous basis, so that IBOC to analog power relationships are maintained.

Figure 8:
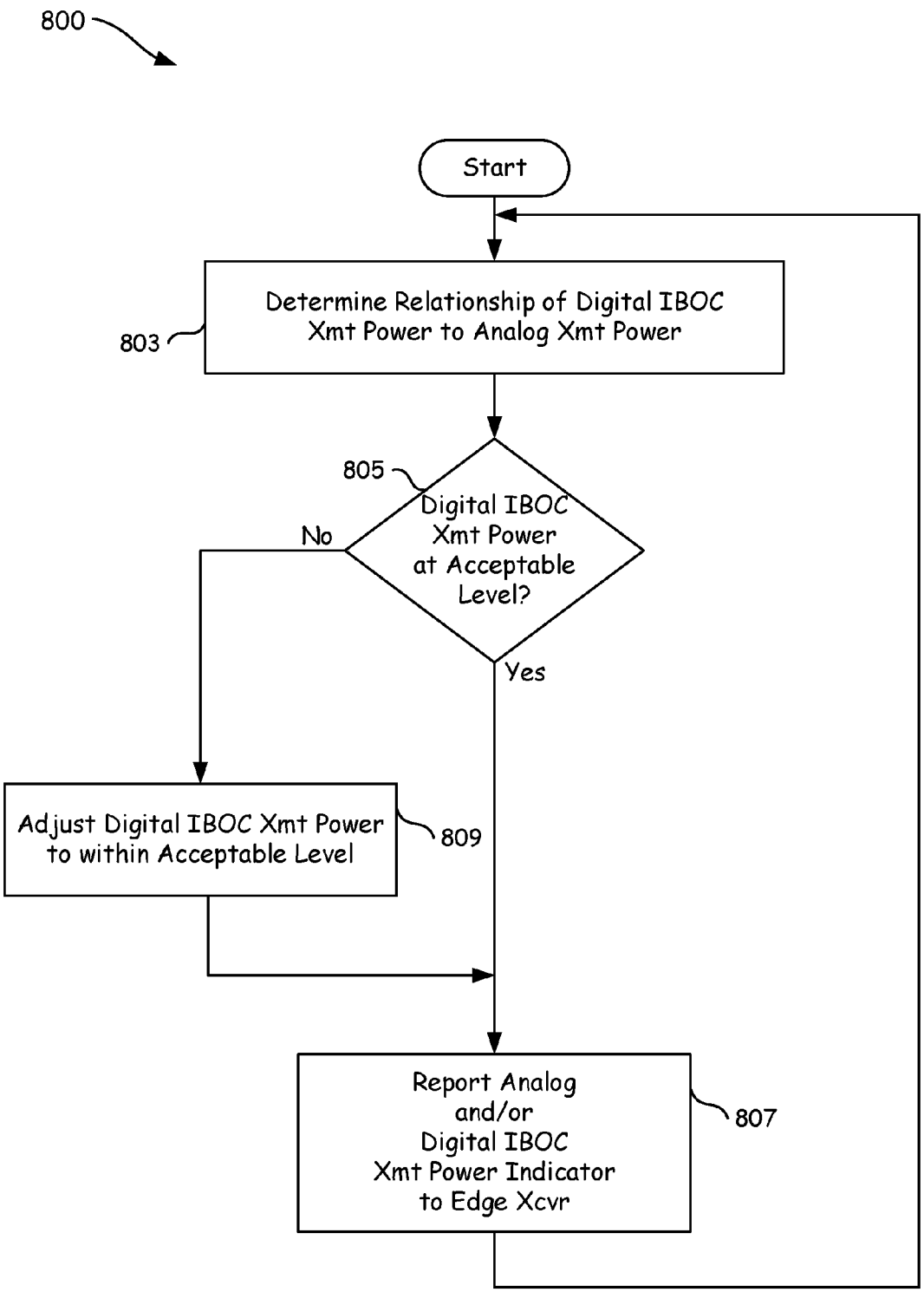
FIG. 8 is a flow chart illustrating a method in which mesh-connected digital IBOC transceivers set their own digital IBOC broadcast power, according to various embodiments of the present disclosure.

Referring next to FIG. 8, a method 800, in which mesh-connected digital IBOC transceivers set their own digital IBOC broadcast power, will be discussed according to various embodiments of the present disclosure. As illustrated by block 803, the mesh receiver determines a relationship between the analog transmit power used to transmit the analog center-band signal and the transmit power of the digital IBOC transmissions in the sidebands of the analog channel. The digital IBOC transceiver can make the determination by using signal strength or other measurements and estimates obtained locally, by using information obtained from a mesh power controller, such as an edge transceiver, by using information from neighboring mesh receivers, or by using a combination of remotely provided information and local measurements or estimates.

As illustrated at block 805, the digital IBOC mesh transceiver checks to determine whether the relationship between digital IBOC transmission power and analog transmission power is within acceptable limits. If the power relationship is determined to be acceptable, for example by comparing a calculated or estimated power relationship to one or more threshold limits, method 800 can report the power relationship to a mesh power controller, such as an edge transceiver, as illustrated by block 807. Reporting the power relationship can include transmitting one or more power indicators, for example an analog power indicator, a digital power indicator, a power relationship indicator, threshold information, and other similar information. In some implementations where reporting is performed, after reporting the power relationship method 800 continues to monitor the power relationship.

As illustrated at block 809, if the power relationship is determined to be outside of acceptable parameters at block 805, the mesh transceiver can adjust its digital IBOC transmit power to bring the power relationship within predetermined threshold values. The digital IBOC power adjustment can be done in small increments, using various control system principles to prevent overcorrection. Additionally, in some embodiments not specifically illustrated, adjustments may be performed only after the power relationship is determined to be unacceptable for a certain length of time, unless the power relationship exceeds a "grossly unacceptable" threshold. In this way, the likelihood of overcorrecting digital IBOC power due to glitches and temporary changes in transmission characteristics can be reduced.

After adjusting the digital IBOC transmit power at block 809, information related to the adjustment can be reported to a mesh power controller as illustrated at block 807. The information related to the adjustment can include power relationship information prior to the adjustment, power relationship information after the adjustment, information about frequency of adjustments, adjustment parameters, and the like.

Figure 9:
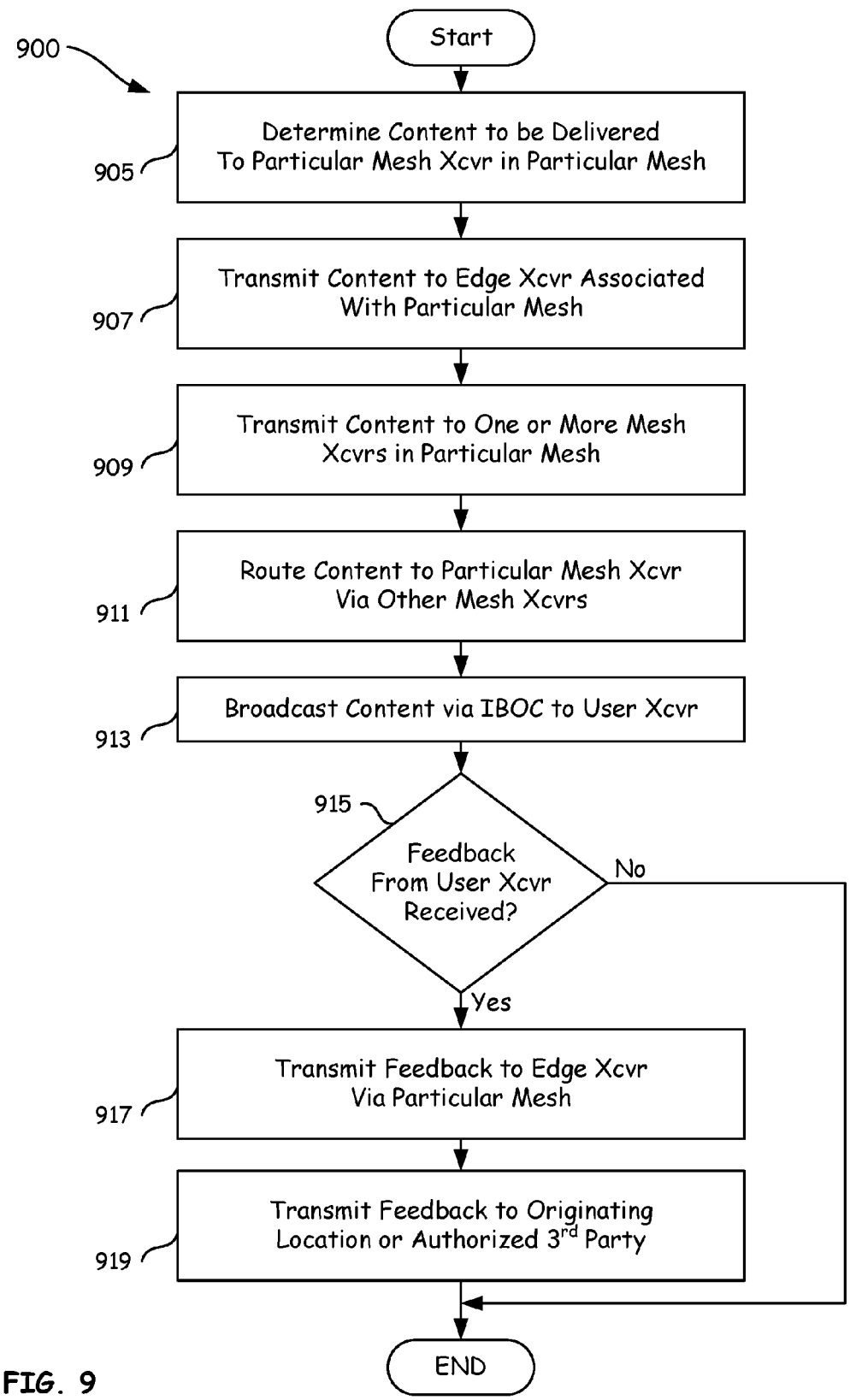
FIG. 9 is a flowchart illustrating a method of IBOC broadcasting using mesh transceivers forming an IBOC mesh network, according to various embodiments of the present disclosure.

Referring next to FIG. 9, a method 900 of IBOC broadcasting using mesh transceivers forming an IBOC mesh network is illustrated and discussed, according to various embodiments of the present disclosure. As illustrated at block 905, the content to be delivered to a particular mesh transceiver in an IBOC mesh network is determined. In some embodiments, all mesh transceivers in a particular IBOC mesh network will broadcast the same content, while in other embodiments, the content delivered by any particular mesh transceiver is not determined only by the mesh network, but can also be determined based on user feedback relating to content delivered by the particular mesh transceiver via IBOC broadcast.

As illustrated at block 909, the content to be IBOC broadcast is sent to one or more edge transceivers associated with the mesh network in which a target mesh transceiver is located. The edge transceiver, or transceivers, to which the content was sent at block 907 transmit that content to the appropriate mesh transceivers for IBOC broadcast. In at least one embodiment, an edge transceiver need only communicate the information to a single mesh transceiver in the appropriate network, and that mesh transceiver will propagate the content to the appropriate mesh transceiver, as illustrated at block 911. A mesh transceiver receiving content can broadcast the content using an IBOC broadcast, as illustrated at block 913.

A check is performed, as illustrated at block 915, to determine whether user feedback related to the IBOC broadcast content has been received by one or more of the mesh transceivers broadcasting the content. If no user feedback has been received, method 900 ends. If, however, user feedback is received at a mesh transceiver, the feedback is moved through the IBOC mesh network and delivered to the edge transceiver, as illustrated at block 917. As illustrated at block 919, the edge transceiver transmits the user feedback to, for example, an originating location or authorized third party, and a user feedback server can be used to process the information for use in selecting future IBOC broadcast content, adjusting the operation of one or more mesh networks, or the like.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of an invention have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples of the invention. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a processor, a functional block, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. An in-band on-channel (IBOC) broadcasting system comprising:
  a plurality of mesh transceivers positioned over a geographic area and communicatively coupled to each other in a mesh configuration to form a mesh network, individual mesh transceivers configured to transmit digital media content, via digital IBOC broadcast, to end users across different portions of a broadcast area associated with an analog media broadcast station;
  an analog broadcast transmitter configured to transmit an analog broadcast signal on a broadcast channel at a first power level, wherein the analog broadcast signal is associated with the analog media broadcast station;
  a content distributor configured to transmit media content to the mesh network for digital IBOC broadcast by individual mesh transceivers; and
  wherein the individual mesh transceivers are further configured to digitally broadcast the media content in IBOC sidebands at second power levels, wherein the second power levels are related to the first power level of the analog broadcast transmitter.

2. The IBOC broadcasting system of claim 1, wherein a second power level of a particular mesh transceiver is set, based at least in part, on a power of the analog broadcast signal determined local to the particular mesh transceiver.

3. The IBOC broadcasting system of claim 1, wherein a second power level of at least one mesh transceiver is set, based at least in part, on a second power level of a geographically adjacent mesh transceiver.

4. The IBOC broadcasting system of claim 1, further comprising:
  an edge transceiver coupled to the content distributor and at least one mesh transceiver of the mesh network, the edge transceiver configured to control digital IBOC power levels of the individual mesh transceivers included in the mesh network.

5. The IBOC broadcasting system of claim 1, wherein at least one of the plurality of mesh transceivers is configured to:
  obtain user input via a user transceiver coupled to receive the digital IBOC broadcast; and
  transmit the user input to another of the plurality of mesh transceivers included in the mesh network.

6. The IBOC broadcasting system of claim 5, wherein the at least one of the plurality of mesh transceivers is configured to obtain the user input via a shared digital sideband of the broadcast channel.

7. An in-band on-channel (IBOC) broadcasting system comprising:
  a plurality of digital IBOC transmitters positioned at a plurality of geographic locations over a geographic area and communicatively coupled to each other in a mesh configuration to form a mesh network;
  the plurality of digital IBOC transmitters configured to digitally broadcast, to end users across different portions of a broadcast area associated with an analog media broadcast station, media content in a sideband of an analog broadcast channel; and
  individual digital IBOC transmitters of the plurality of digital IBOC transmitters further configured to digitally broadcast the media content at IBOC power levels set based, at least in part, on a target ratio of an IBOC power level of an individual IBOC transmitter to a power level of an analog signal broadcast on the analog broadcast channel.

8. The IBOC broadcasting system of claim 7, further comprising:
  an analog broadcast transmitter positioned at a geographic location different from at least some of the plurality of digital IBOC transmitters, the analog broadcast transmitter configured to transmit the analog signal.

9. The IBOC broadcasting system of claim 8, wherein the IBOC power level of a first digital IBOC transmitter included in the mesh network is set based on the power level of the analog signal determined, based at least in part, by a power measurement at the first digital IBOC transmitter.

10. The IBOC broadcasting system of claim 9, wherein the IBOC power level of a second digital IBOC transmitter is set, based at least in part, on the IBOC power level of the first digital IBOC transmitter.

11. The IBOC broadcasting system of claim 7, further comprising:
  an edge transceiver coupled to the mesh network, the edge transceiver configured to separately control the IBOC power levels of the individual digital IBOC transmitters.

12. The IBOC broadcasting system of claim 7, wherein at least one of the plurality of digital IBOC transmitters is configured to:
  forward user input obtained from a user transceiver receiving the digital IBOC broadcast to a feedback server associated with a broadcast originator via the mesh network.

13. An in-band on-channel (IBOC) broadcasting system comprising:
  a plurality of IBOC transmitters positioned at a plurality of geographic locations over a geographic area related to a broadcast area associated with an analog media broadcast station and communicatively coupled to each other in a mesh configuration to form a mesh network;
  individual IBOC transmitters of the plurality of IBOC transmitters configured to digitally broadcast, to end users across different portions of the broadcast area associated with the analog media broadcast station, media content in a sideband of an analog broadcast channel;
  at least one of the plurality of IBOC transmitters further configured to receive, from a user device receiving the media content, the feedback related to the digitally broadcast media content; and
  the at least one of the plurality of IBOC transmitters further configured to forward the feedback, via the mesh network, to an edge transceiver.

14. The IBOC broadcasting system of claim 13, further comprising:
  an analog broadcast transmitter positioned at a geographic location different from at least some of the plurality of IBOC transmitters, the analog broadcast transmitter configured to transmit an analog broadcast signal on the analog broadcast channel at a first power level.

15. The IBOC broadcasting system of claim 14, the at least one of the plurality of IBOC transmitters further configured to:
  digitally broadcast the media content at an IBOC power level set based, at least in part, on a target ratio of the IBOC power level to a power level to the first power level.

16. The IBOC broadcasting system of claim 15, wherein the IBOC power level is set, based at least in part, on a measurement of the first power level at the at least one of the plurality of IBOC transmitters.

17. The IBOC broadcasting system of claim 13, further comprising:
  the edge transceiver, the edge transceiver further configured to control IBOC power levels of the plurality of IBOC transmitters.

18. The IBOC broadcasting system of claim 13, further comprising:
  a digital content distributor coupled to the mesh network and configured to transmit the media content to the mesh network via the edge transceiver.

19. The IBOC broadcasting system of claim 13, wherein the at least one of the plurality of IBOC transmitters is configured to receive user input via a shared digital sideband of the analog broadcast channel.

* * * * *